E. W. DOYLE.
SAW GAUGE.
APPLICATION FILED MAR. 6, 1922.
1,437,586.
Patented Dec. 5, 1922.
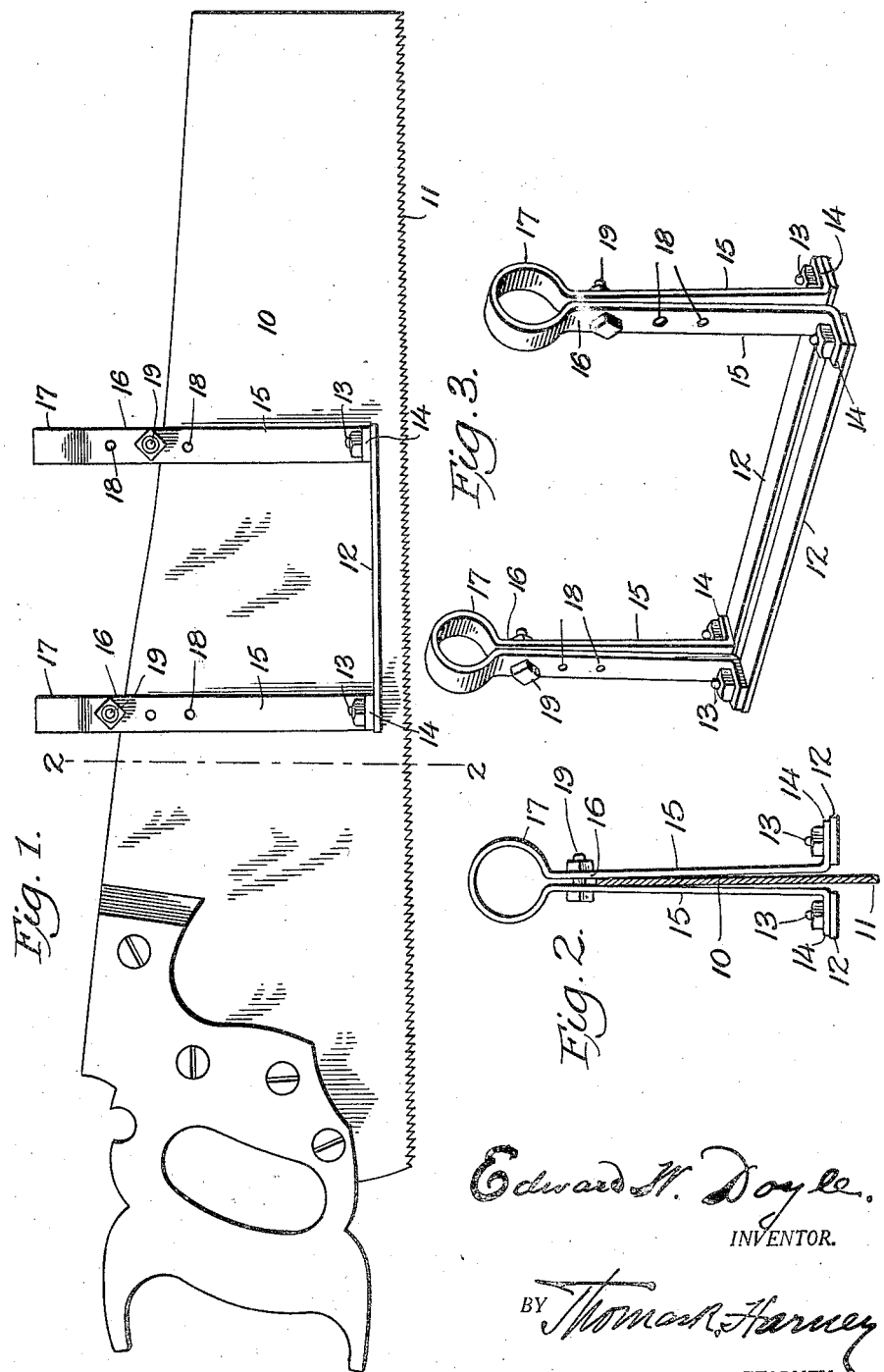
Edward W. Doyle,
INVENTOR.
BY Thomas R. Harney
ATTORNEY.

Patented Dec. 5, 1922.

1,437,586

UNITED STATES PATENT OFFICE.

EDWARD W. DOYLE, OF NEWBERG, OREGON.

SAW GAUGE.

Application filed March 6, 1922. Serial No. 541,345.

*To all whom it may concern:*

Be it known that I, EDWARD W. DOYLE, a citizen of the United States of America, residing at Newberg, in the county of Yamhill and State of Oregon, have invented certain new and useful Improvements in Saw Gauges, of which the following is a specification.

My present invention relates generally to saw gauges, and more particularly to a depth gauge for hand saws, my object being the provision of a simple, strong and durable device of this nature, which is small in size, may be easily packed away with other tools and implements, and which may be easily and quickly adjusted in use.

A still further object is the provision of a device of the above nature which may be applied to a saw without perforating or otherwise modifying the ordinary saw blade, and which provides gauge runners at opposite sides of the saw blade so as to hold the saw firmly on both sides in use.

In the accompanying drawing illustrating my present invention and forming a part of this specification, Figure 1 is a side elevation of a hand saw showing the practical application of my invention, Figure 2 is a vertical transverse section therethrough taken substantially on line 2—2 of Figure 1, and Figure 3 is a detail perspective view of my improved gauge removed.

Referring now to these figures and particularly to Figures 1 and 2 I have shown a saw blade at 10, of the usual tapering form, parallel to the saw tooth edge 11 of which my improved device is adapted and intended to supply gauge runners 12, located at opposite sides of the blade 10. These gauge runners are in the form of flat rectangular bars, securely connected at their opposite ends by means of connecting bolts 13 with their lower angular outstanding projections 14 at the free ends of the parallel equal extensions 15 of a pair of clamps 16, each clamp having the opposite ends of its extensions 15 integrally joined by a connecting bow or loop 17.

The extensions 15 of each of the clamps, between which the blade 10 of the saw is engaged in use as clearly seen by a comparison of Figures 1 and 2, have transversely alined openings 18 in lengthwise series starting from a point adjacent to the connecting bows or loops 17, for the reception of clamping bolts 19 which may be extended through selected alined apertures so as to be positioned near the back edge of the saw blade and thus effect maximum grip of the clamps on the saw blade in adjustably holding the gauge runners or bars 12 in selectively spaced relation to the toothed edge 11 of the saw.

It is thus obvious that the device proposed by my invention, which is of itself simple and inexpensive yet at the same time strong and durable, may be quickly and easily inserted in adjustable position for use and removed from the saw blade, and that by virtue of the gauge runners or bars upon relatively opposite sides of the saw blade, the latter will be firmly held at both sides when the desired depth of cut has been completed.

I claim:

A depth gauge for saws consisting of a pair of saw blade clamps, each having parallel equal extensions integrally united at one end and terminating at their opposite free ends in angular outstanding projections, clamping bolts extending through the extensions of each clamp intermediate its ends to connect the extensions and clampingly engage them on a saw blade, and spaced parallel gauge bars extending between the clamps and securely connected at their ends and in flatwise relation to the said angular projections of the clamp extensions, whereby to cooperate with said projections in reinforcing and strengthening the extensions of the clamps.

In testimony whereof I have affixed my signature.

EDWARD W. DOYLE.